United States Patent
Gaucher et al.

(10) Patent No.: US 12,122,330 B2
(45) Date of Patent: Oct. 22, 2024

(54) DEVICE FOR CONNECTING A WIPER BLADE TO A WIPER ARM

(71) Applicant: Valeo Systèmes d'Essuyage, Le Mesnil Saint Denis (FR)

(72) Inventors: Vincent Gaucher, Le Mesnil Saint Denis (FR); Eric Poton, Le Mesnil Saint Denis (FR); Stéphane Houssat, Le Mesnil Saint Denis (FR)

(73) Assignee: VALEO SYSTÈMES D'ESSUYAGE, Le Mesnil Saint Denis (FR)

( * ) Notice: Subject to any disclaimer, the term of this patent is extended or adjusted under 35 U.S.C. 154(b) by 0 days.

(21) Appl. No.: 18/016,760

(22) PCT Filed: Jul. 7, 2021

(86) PCT No.: PCT/EP2021/068903
§ 371 (c)(1),
(2) Date: Jan. 18, 2023

(87) PCT Pub. No.: WO2022/017806
PCT Pub. Date: Jan. 27, 2022

(65) Prior Publication Data
US 2024/0034276 A1 Feb. 1, 2024

(30) Foreign Application Priority Data

Jul. 22, 2020 (FR) ...................................... 2007675

(51) Int. Cl.
*B60S 1/40* (2006.01)
(52) U.S. Cl.
CPC ........... *B60S 1/4003* (2013.01); *B60S 1/4048* (2013.01); *B60S 2001/4051* (2013.01); *B60S 2001/4054* (2013.01)
(58) Field of Classification Search
CPC .... B60S 1/4003; B60S 1/4038; B60S 1/4045; B60S 1/4048; B60S 2001/4054; B60S 2001/4051 USPC ...................... 15/250.32
See application file for complete search history.

(56) References Cited

U.S. PATENT DOCUMENTS

2013/0007977 A1* 1/2013 Depondt ................. B60S 1/387
15/250.32
2020/0122690 A1* 4/2020 Kawashima .......... B60S 1/4038

FOREIGN PATENT DOCUMENTS

KR      20-0438836       *  3/2008
WO      2019/034242      *  2/2019

OTHER PUBLICATIONS

Machine translation of description portion of Korean publication 20-0438836, published Feb. 2008. (Year: 2008).*

* cited by examiner

Primary Examiner — Gary K. Graham
(74) Attorney, Agent, or Firm — Osha Bergman Watanabe & Burton LLP

(57) ABSTRACT

A connection device for connecting a wiper blade to at least two wiper arms is disclosed. The connection device includes at least one main connection member configured to cooperate with a clevis of a first wiper arm and at least one secondary connection member configured to cooperate with a clevis of a second wiper arm, the main connection member and the secondary connection member being mounted on one another in a stacking direction (D), the main connection member comprising at least two flanks connected together by an upper wall supporting a retractable button configured to cooperate with the clevis of the first wiper arm, the secondary connection member comprising at least one side lug for engaging with the clevis of the second wiper arm, the secondary connection member comprising at least one protrusion configured to cooperate with the clevis of the second wiper arm.

9 Claims, 4 Drawing Sheets

[Fig. 1]
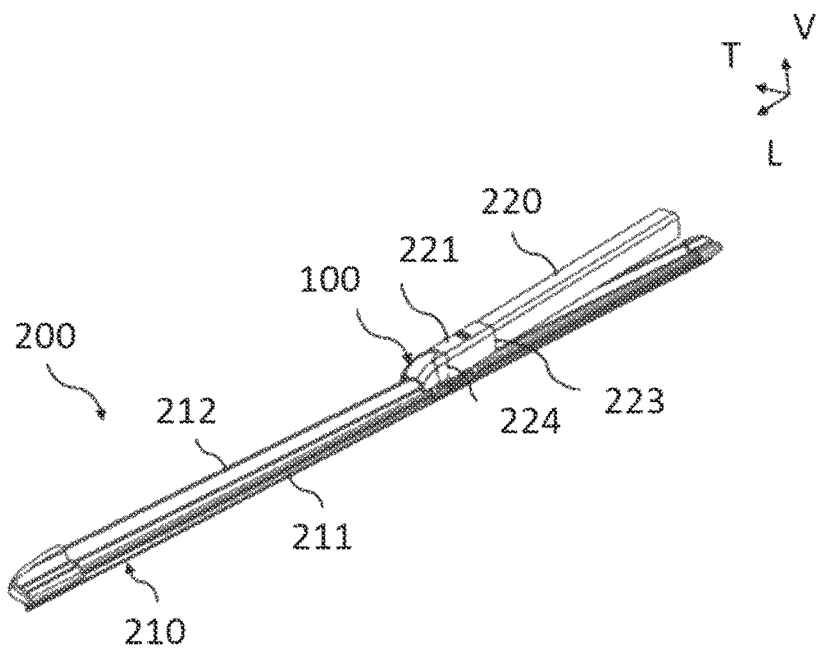
[Fig. 2]
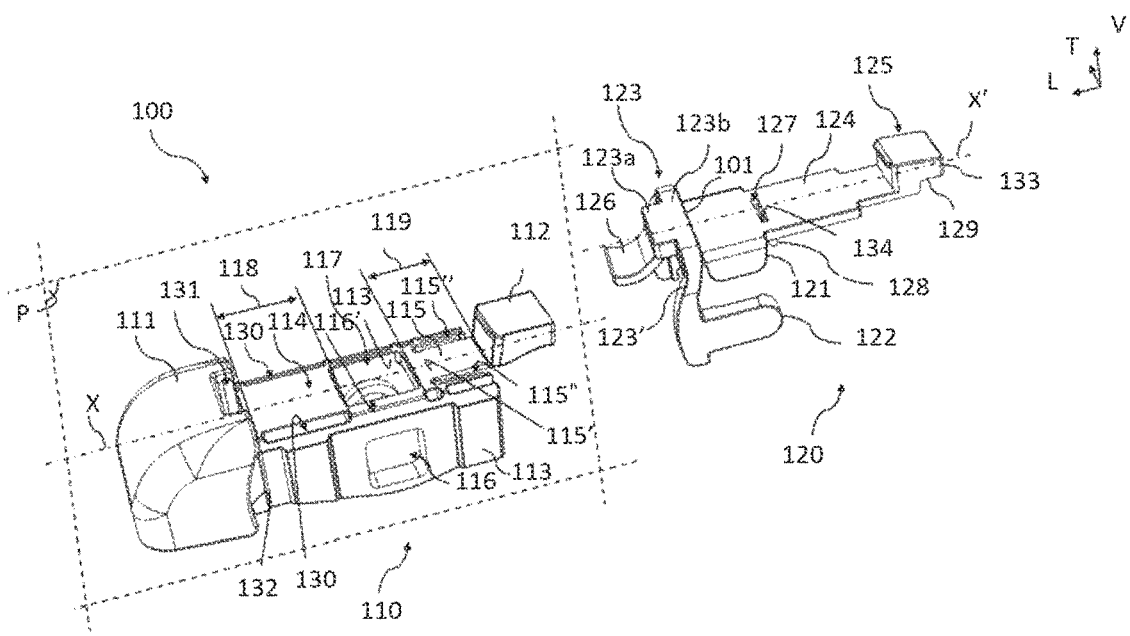

[Fig. 3]
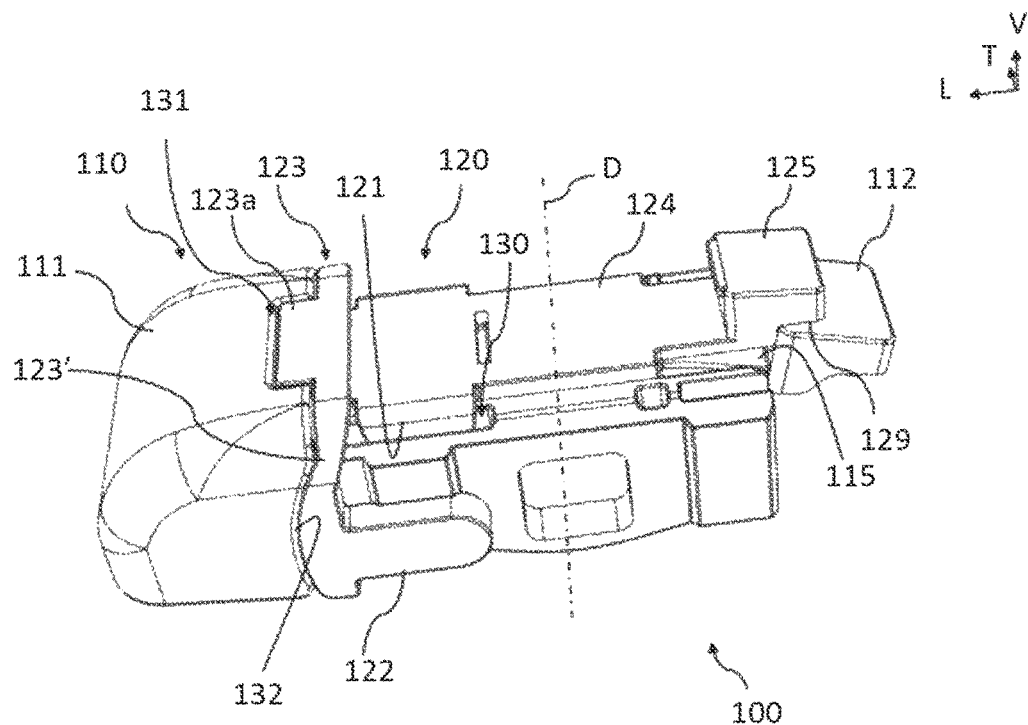
[Fig. 4]
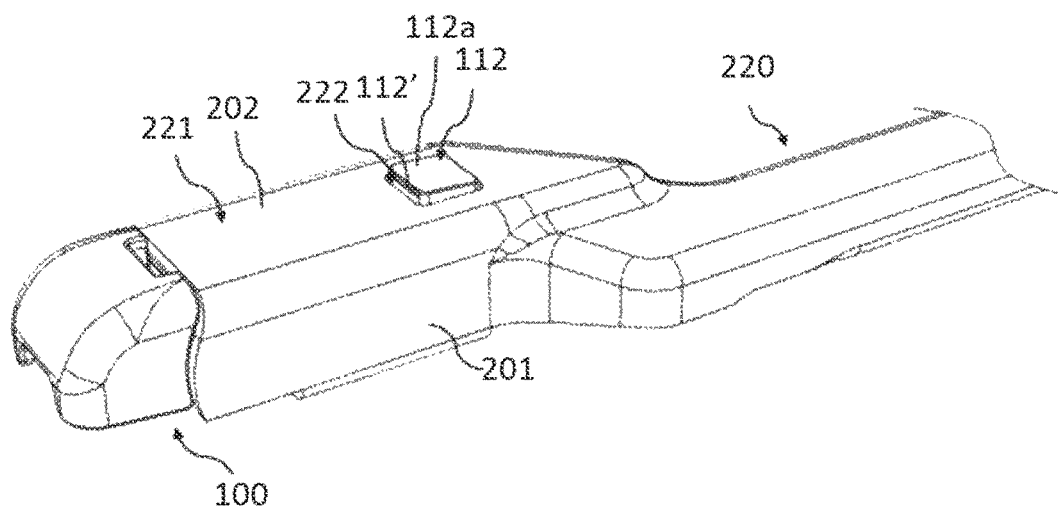

[Fig. 5]
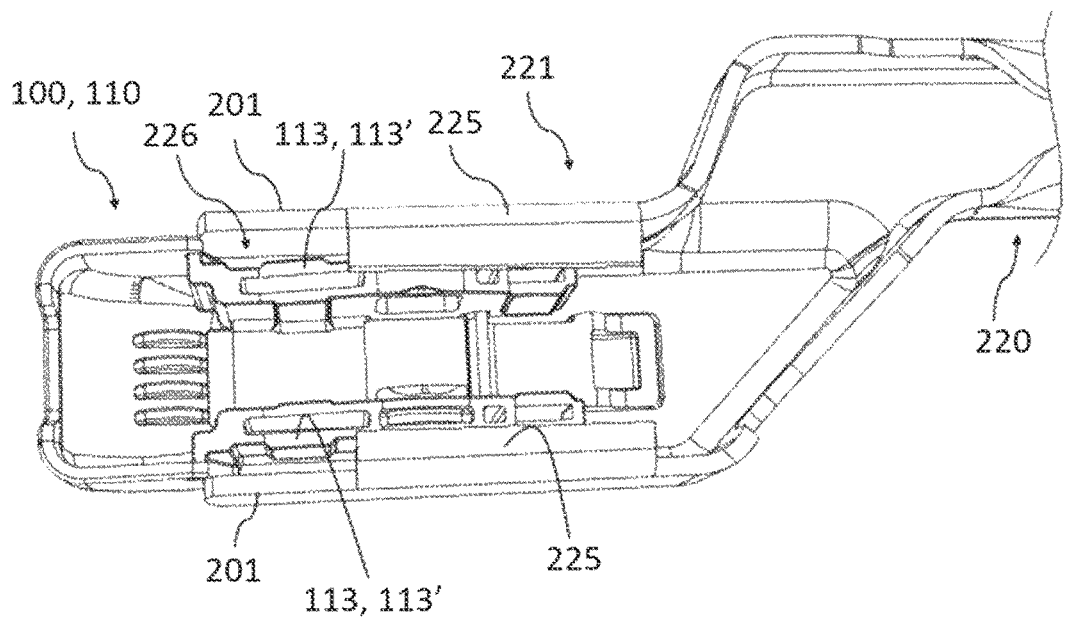
[Fig. 6]
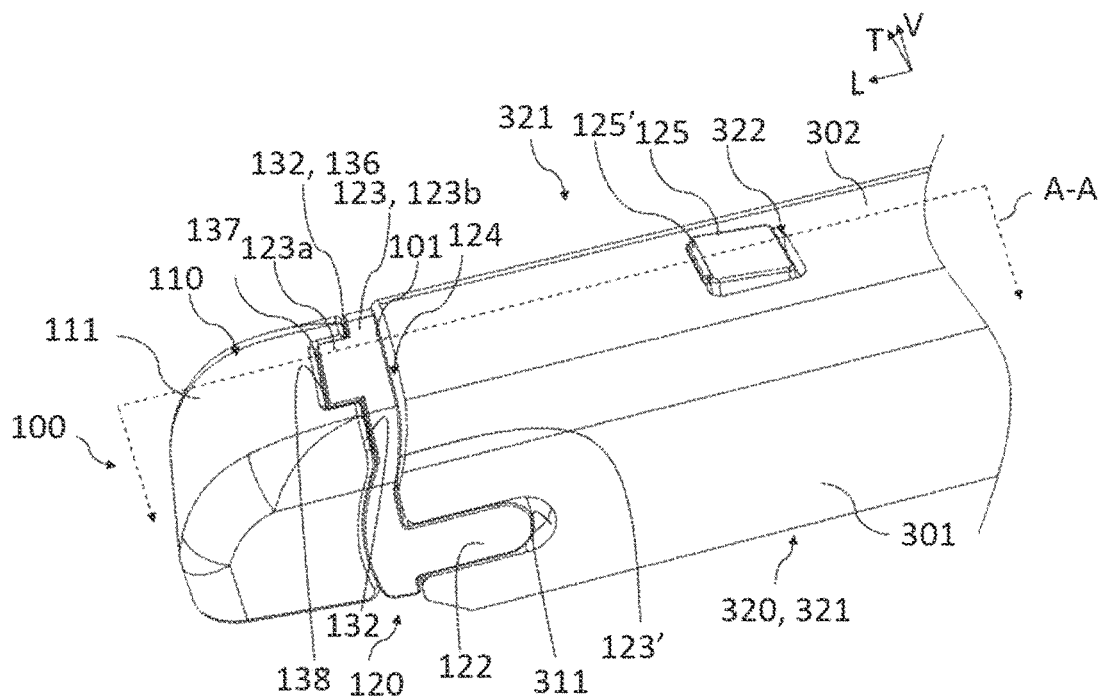

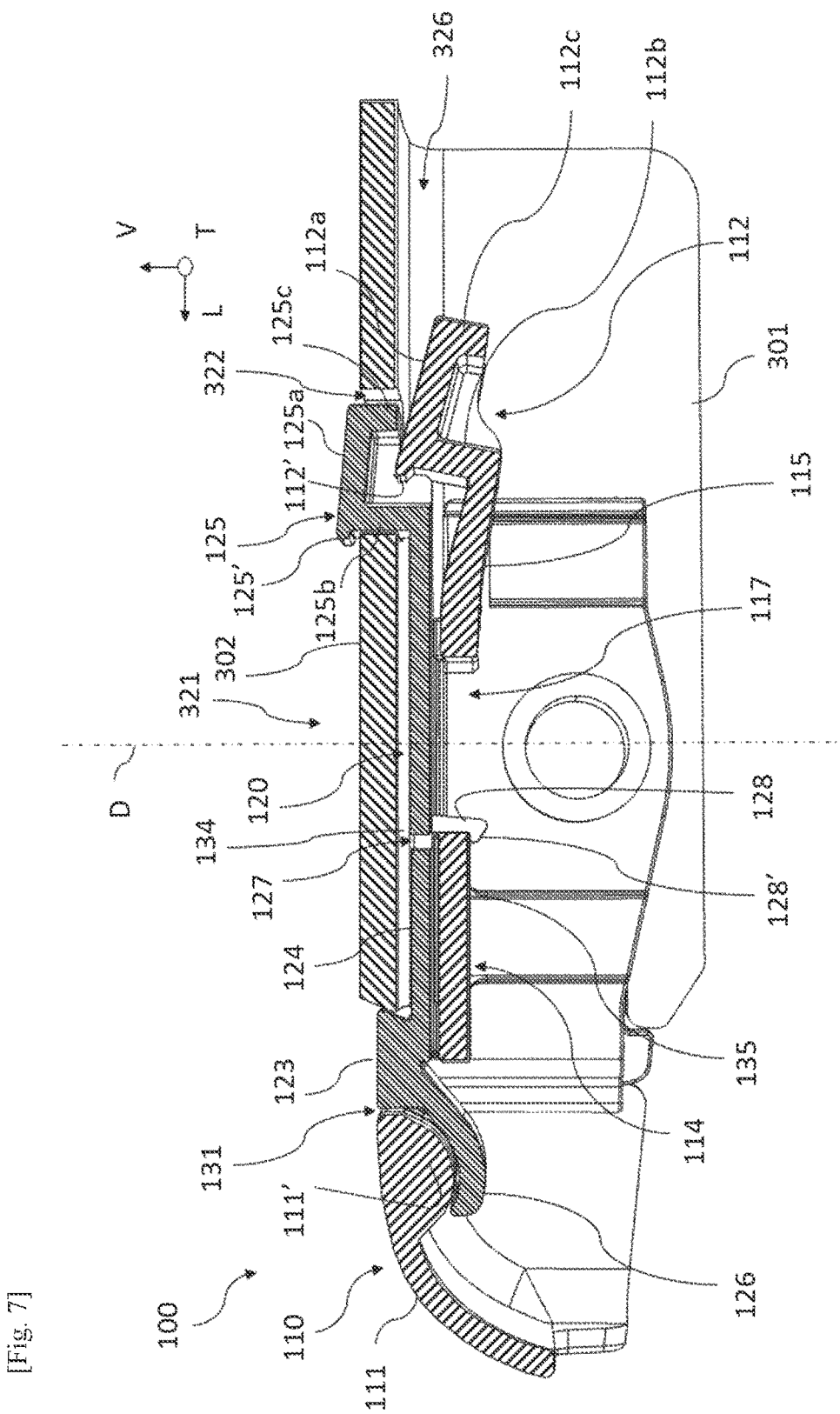

DEVICE FOR CONNECTING A WIPER BLADE TO A WIPER ARM

The field of the present invention is that of wiper systems intended for motor vehicles. More particularly, the field of the present invention is that of connection means implemented between a wiper arm and a wiper of such a wiper system.

Motor vehicles are commonly provided with wiper systems intended for cleaning the glazed surfaces, and in particular the windshields, thereof. Such wiper systems comprise at least one wiper arm and a wiper driven by the wiper arm. The wiper arm is thus connected to an electric motor of the vehicle and the wiper comprises at least one wiper blade suitable for coming into contact with the glazed surface to be cleaned. A connection device is arranged between the wiper and the wiper arm so that the wiper can be driven. Such a connection device conventionally comprises at least one connector rigidly connected to the wiper and at least one adapter allowing the connector, and therefore the wiper to which it is fastened, be connected to the wiper arm.

There are currently a multitude of different wiper arms that require as many different connection devices for fastening them to the wiper. Connection devices suitable for use on most of said wiper arms are currently sold. However, the latest innovations in this field are making these connection devices obsolete.

The present invention fits into this context by proposing a connection device that allows for the connection between a wiper blade and at least two structurally different wiper arms.

The present invention thus relates to a connection device suitable for connecting a wiper blade to at least two wiper arms, the connection device comprising at least one main connection member configured to cooperate with a clevis of a first wiper arm and at least one secondary connection member configured to cooperate with a clevis of a second wiper arm, the main connection member and the secondary connection member being suitable for being mounted on one another in a stacking direction, the main connection member comprising at least two flanks connected together by an upper wall supporting a retractable button configured to cooperate with the clevis of the first wiper arm, the secondary connection member comprising at least one side lug suitable for engaging with the clevis of the second wiper arm, the secondary connection member comprising at least one protrusion configured to cooperate with the clevis of the second wiper arm.

The present invention makes it possible to use the same connection device to connect the wiper blade to the first wiper arm, or to the second wiper arm, which differ from each other in particular in the structure of their respective clevises. In the case of use with the clevis of the first wiper arm, the connection device is devoid of the secondary connection member. In the case of use with the clevis of the second wiper arm, the connection device comprises both the main connection member and the secondary connection member stacked on top of each other in the stacking direction.

According to a feature of the invention, the retractable button is suitable for being received in an orifice provided in the clevis of the first wiper arm. For example, the clevis of the first wiper arm may comprise at least two side walls connected to each other by an upper wall in which the orifice is provided. An cooperation between the retractable button and a contour of the orifice participates in holding the connection device in the clevis of the first wiper arm.

According to another feature of the invention, the protrusion is suitable for being received in a hole provided in the clevis of the second wiper arm. For example, the clevis of the second wiper arm may comprise at least two side walls connected to each other by a upper wall in which the hole is provided. Advantageously, the hole is a through hole, i.e., this hole opens out on an upper face and on a lower face of the upper wall of the clevis of the second wiper arm in which the hole is provided. An cooperation between the protrusion and a contour of the hole participates in holding the connection device in the clevis of the second wiper arm.

The clevis of the first wiper arm and the clevis of the second wiper arm have structural differences. In particular, the position of the orifice in the upper wall of the first wiper arm clevis has a longitudinal offset from the position of the hole in the upper wall of the second wiper arm clevis. For example, a distance measured between a free longitudinal end of the clevis of the first wiper arm and the contour of the orifice provided in that clevis is less than a distance measured between a free longitudinal end of the clevis of the second wiper arm and the contour of the hole provided in the upper wall of that clevis. The two aforementioned distances are measured along a straight line that lies in a main plane of extent of the upper wall of the clevis of the wiper arm concerned and also in a plane parallel to a main plane of extent of at least one of the side walls of this clevis. The expression "free longitudinal end of the clevis" means an end of the clevis concerned suitable for being engaged with the connection device according to the invention.

Advantageously, the retractable button is configured to generate a force against the protrusion. For example, the upper wall of the main connection member comprises a resilient tongue carrying the retractable button. The term "resilient tongue" here means a tongue suitable for returning to its initial position after undergoing mechanical deformation. It is thus understood that the resilience of this tongue contributes to conferring to the button its retractable character. As mentioned above, in the case of a use with the clevis of the second wiper arm, the secondary connection member is stacked on the main connection member in the stacking direction. Advantageously, the resilient nature of the resilient tongue carrying the retractable button ensures the generation of force against the protrusion, said force participating in holding the protrusion in place in the hole provided in the upper wall of the clevis of the second wiper arm. In other words, the resilient tongue acts as a spring that pushes the protrusion, by means of the retractable button, so as to prevent this protrusion from escaping the hole provided in the clevis of the second wiper arm. In other words, it is understood that the protrusion is suitable for being interposed, at least partially, between the retractable button and the hole provided in the clevis of the second wiper arm.

It is thus appropriate to consider that the retractable button has a first function of mechanically holding the main connection member in the clevis of the first wiper arm, thanks to the cooperation between this retractable button and the contour of the orifice provided in this clevis, as well as a second function of holding the protrusion in position within the hole provided in the clevis of the second wiper arm.

Advantageously, the secondary connection member may comprise at least one retaining member suitable for engaging with the upper wall of the main connection member. In particular, this retaining member may be suitable for engaging with a lower face of the upper wall of the main connection member. Advantageously, this retaining member makes it possible to prevent, or at least to limit, movements along the stacking direction of the secondary connection member with respect to the main connection member, i.e., movements in a vertical direction. This at least one retaining member thus participates in holding the secondary connection member on the main connection member.

According to a feature of the invention, the secondary connection member may comprise at least two side lugs, each extended by a side branch, the two side branches being connected to each other by an upper bridge, this upper bridge being extended by an upper wall bearing the protrusion. For example, the upper bridge and the side branches can be arranged in a U-shape, wherein the upper bridge forms a base of this U shape, from which each of the side branches originates. Each side branch is extended by one of the side lugs, with a main plane of extent of each side lug being coincident with a main plane of extent of the side branch that it extends. Each side lug also extends in a main direction of extent secant to, advantageously perpendicular to, a main direction of extent of the side branch that it extends. Each side lug has an oblong shape, a rounded portion of which extends backwards, i.e. away from the side branch that it extends.

For example, the at least one retaining member may emerge from the upper wall of the secondary connection member and extend in a direction perpendicular to a main plane of extent of the upper wall of the secondary connection member. Advantageously, this at least one retaining member extends more particularly in a space delimited, at least partially, by the upper wall and by the side lugs of the secondary connection member. For example, this retaining member may take the form of a rod which originates on the upper wall of the secondary connection member and which ends in a lug suitable for engaging with the lower face of the upper wall of the main connection member. In other words, in the case of use of the connection device with the clevis of the second wiper arm, the upper wall of the main connection member is sandwiched between the upper wall of the secondary connection member and the lug of the retaining member. Advantageously, the secondary connection member may comprise two mutually identical retaining members.

According to a feature of the invention, the upper bridge and the upper wall of the secondary connection member extend in two parallel and distinct planes. In other words, the upper bridge has a shoulder forming a vertical offset with respect to the upper wall of the secondary connection member, i.e., an offset along the stacking direction of the secondary connection member on the main connection member. The upper bridge thus comprises a first abutment suitable for bearing against the main connection member and a second abutment, formed by the shoulder generated by the aforementioned vertical offset, against which the clevis of the second wiper arm is suitable for bearing. In other words, the upper bridge is interposed longitudinally between a longitudinal end of the clevis of the second wiper arm and the main connection member of the connection device.

According to an example of the invention, the main connection member extends along a main axis of extent between a head and the retractable button. Advantageously, the secondary connection member may comprise at least one projection suitable for cooperating with said head, advantageously with a bead provided under the head of the main connection member. Advantageously, this cooperation allows a vertical locking of the secondary connection member with respect to the main connection member, i.e. a locking according to the stacking direction of the secondary connection member on the main connection member.

The projection has a curved profile, seen in a longitudinal and vertical plane, for example a median plane, of the secondary connection member. Advantageously, this curved profile makes it possible to form a guide for mounting the secondary connection member on the main connection member. According to a feature of the invention, the projection configured to cooperate with the head of the main connection member emerges from the upper bridge of the secondary connection member.

According to a feature of the invention, at least one cavity may be provided, at least in the upper wall of the main connection member, and the secondary connection member may comprise at least one tab configured to be received in the at least one cavity of the main connection member. For example, this cavity may be provided in at least one of the flanks of the main connection member and open out into an upper face of the upper wall of the main connection member.

For example, the at least one tab emerges from the upper wall of the secondary connection member. More particularly, this at least one tab may originate on the upper wall of the secondary connection member and extend toward the side lugs of the secondary connection member.

The cooperation between the tab of the secondary connection member and the cavity provided in the main connection member makes it possible to limit a longitudinal movement of this secondary connection member with respect to the main connection member, i.e., a movement in a direction parallel to the main axis of extent of the main connection member. Advantageously, the cooperation between the tab of the secondary connection member and the cavity provided in the upper wall of the main connection member also makes it possible to limit the forces transmitted during the phases of wiping a glass surface by the wiping system equipped with the connection device according to the invention. In other words, this cooperation between the tab of the secondary connection member and the cavity of the main connection member has a force recovery function during these wiping phases. Advantageously, such a force recovery makes it possible to perpetuate the connection between the connection device and the clevis of the second wiper arm, and therefore also the connection between the wiper blade and the second wiper arm.

For example, the at least one tab emerges from the upper wall of the secondary connection member. Advantageously, two tabs emerge from the upper wall of the secondary connection member and two cavities are provided in the upper wall of the main connection member, each tab being received in one of the cavities.

The present invention also relates to an assembly consisting of a wiper blade and a connection device as just described. The term "assembly" here means an arrangement of the wiper blade as well as the connection device in a single container suitable for sale. For example, the assembly may comprise a package that contains the wiper blade, the main connection member and the secondary connection member of the connection device.

The present invention also relates to a wiper system comprising at least one wiper blade connected to a first wiper arm or to a second wiper arm via a connection device according to the invention. According to a feature of the invention, the two flanks and the upper wall of the main connection member of the connection device delimit a housing suitable for receiving at least a portion of the wiper blade. More particularly, this housing is suitable for receiving a connector integral with the wiper blade.

According to the invention, the first wiper arm and the second wiper arm comprise at least one clevis each, consisting of at least two side walls connected to each other by an upper wall, the two side walls and the upper wall defining a receiving zone suitable for receiving the connection device. The clevis of the first wiper arm and the clevis of the second wiper arm also have identical internal widths. The expression "internal width of a clevis" means a dimension of this clevis measured between its two side walls in a direction perpendicular to a main plane of extent of a first side wall of the clevis and to a main plane of extent of a second side wall of this clevis. As discussed above, the clevis of the first wiper arm and the clevis of the second wiper arm differ from each other at least in the position of the orifice in the upper wall of the clevis of the first wiper arm relative to the position of the hole in the upper wall of the clevis of the second wiper arm. As mentioned above, the cooperation of the retractable button with the contour of the orifice in the clevis of the first wiper arm and the cooperation of the protrusion with the contour of the hole in the clevis of the second wiper arm form, respectively, a first means of cooperation between the relevant wiper arm and the connection device according to the invention. In addition, each of these clevises comprises at least a second means for cooperation with the connection device according to the invention.

The second cooperation means of the clevis of the first wiper arm comprises, for example, at least one folded edge suitable for engaging with the connection device. More particularly, at least one lower edge of at least one of the side walls of the clevis of the first wiper arm is folded towards the housing defined by the side walls and the upper wall of this clevis and this folded edge is configured to abut against a lower edge of one of the flanks of the main connection member of the connection device. A "lower edge of the side wall" is defined as a free edge of that side wall arranged opposite an edge of that side wall by which it is connected to the upper wall of the clevis. Similarly, "lower edge of the flank" means a free edge of that flank arranged opposite an upper edge of that flank by which it is connected to the upper wall of the main connection member. In other words, once the wiper system is assembled, at least the upper wall and one of the flanks of the main connection member are sandwiched between the upper wall of the clevis of the first wiper arm and the at least one folded edge of this clevis, so that the vertical movements i.e., parallel to a direction perpendicular to a main plane of extent of the upper wall of the clevis of the first wiper arm, of the main connection member with respect to the clevis of the first wiper arm are prevented, or at least limited. Advantageously, the second cooperation means of the clevis of the first wiper arm comprises two folded edges, each side wall of the clevis then having a fold of its lower edge and each folded lower edge thus formed coming into abutment against a lower edge of each of the flanks of the main connection member.

The second cooperation means of the clevis of the second windscreen wiper arm comprises, for its part, at least one aperture provided in at least one of the two side walls of the clevis of this second windscreen wiper arm, the at least one side lug of the secondary connection member being received in this aperture. Advantageously, the secondary connection member may comprise two side lugs suitable for being arranged in contact with one each of the flanks of the main connection member, at least one aperture being provided in each of the side walls of the clevis of the wiper arm, each side lug being suitable for being received in one of the apertures. Advantageously, the cooperation between the side lugs of the secondary connection member and the apertures of the clevis of the second wiper arm makes it possible to prevent, or at least to limit, a vertical movement of the secondary connection member, and thus of the connection device of which it is a part, with respect to this clevis, i.e., a movement along the stacking direction of the secondary connection member on the main connection member. For example, each of these apertures may take the form of an oblong cutout open longitudinally.

Further details, features and advantages will become more clearly apparent from reading the detailed description given below and with reference to the various embodiments illustrated, by way of example, in the following figures:

FIG. 1 is a schematic perspective view of a wiper system according to the invention;

FIG. 2 is an exploded view of a connection device according to the invention;

FIG. 3 is a perspective view of a main connection member and a secondary connection member of the connection device according to the invention, shown stacked on top of each other;

FIG. 4 is a partial perspective view, from above, of the connection device according to the invention shown in cooperation with a clevis of a first wiper arm of a wiper system according to the invention;

FIG. 5 is a partial perspective view of the connection device according to the invention shown in cooperation with the clevis of the first wiper arm of the wiper system according to the invention;

FIG. 6 is a partial perspective view of the connection device according to the invention shown in cooperation with a clevis of a second wiper arm of a wiper system according to the invention; and FIG. 7 is a partial view, in longitudinal section, of the connection device according to the invention shown in cooperation with the clevis of the second wiper arm of the wiper system according to the invention.

The features, variants and different embodiments of the invention may be associated with each other in various combinations, provided that they are not incompatible or mutually exclusive. In particular, it will be possible to imagine variants of the invention comprising only a selection of features described hereinafter in isolation from the other features described, if this selection of features is sufficient to confer a technical advantage or to differentiate the invention from the prior art.

In the figures, the terms "longitudinal", "transverse", "side", "left", "right", "above" and "below" refer to the orientation, with reference to a trihedron L, V, T, of a connection device 100 according to the invention. Within this frame of reference, a longitudinal axis L represents a longitudinal direction, a transverse axis T represents a transverse direction, and a vertical axis V represents a vertical direction of the object in question. Within this frame of reference, a transverse section corresponds to a cross-section made in a transverse and vertical plane, that is, in a plane containing the transverse axis T and the vertical axis V of the trihedron. A longitudinal section denotes a cross-section made in a longitudinal and vertical plane, that is, a plane containing the longitudinal axis L and the vertical axis X. In the description which follows, the terms "wiper" and "wiper blade" are used indiscriminately, as are the terms "wiper arm" and "arm".

FIG. 1 schematically illustrates, in perspective, a wiper system 200 according to the invention. As shown, this wiper system 200 comprises at least one wiper blade 210 and at least one first wiper arm 220 connected to each other by at least one connection device 100 according to the invention.

As shown, the connection device 100 more particularly allows the wiper blade 210 to be connected to a clevis 221 of the first wiper arm 220. Advantageously, the connection device 100 according to the invention is suitable for connecting the wiper blade 210 to the first wiper arm 220 as shown in FIG. 1 and also to at least one second wiper arm, for example shown in FIGS. 6 and 7.

The wiper blade 210 comprises at least one wiper blade 211 suitable for coming into contact with a glass surface of a vehicle equipped with the wiping system 200 according to the invention, at least one stiffening member—not visible in FIG. 1—and at least one air deflector 212. The term "air deflector" means an element configured to transform a pressure applied by an air flow circulating along the glass surface into a force for pressing the wiper blade 210 against the glass surface of the motor vehicle.

With regard to the first wiper arm 220, this is configured to drive the wiper blade 210 in rotation. For example, the first wiper arm 220 may thus comprise a first longitudinal end formed by the clevis 221 intended to be connected to the connection device 100 and a second longitudinal end intended to be connected to an electric motor arranged on the vehicle. With regard to the clevis 221, this has at least one longitudinal end 223 by which it is attached to the first wiper arm 220 and at least one free longitudinal end 224, suitable for being arranged in contact with at least a portion of the connection device 100. These two longitudinal ends 223, 224 are opposite each other along the longitudinal axis L of the illustrated trihedron.

According to the invention, the second wiper arm has a structure similar to that of the first wiper arm. The structural differences between these two types of wiper arms will be further detailed below.

FIG. 2 illustrates, in an exploded view, a connection device 100 according to the present invention. This connection device 100 comprises at least one main connection member 110 and at least one secondary connection member 120 suitable for being mounted on each other along a vertical stacking direction, i.e., a direction parallel to the vertical axis V of the illustrated trihedron and oriented in a downward direction.

The main connection member 110 extends along a main axis of extent X parallel to the longitudinal axis L of the illustrated trihedron between a head 111 and a retractable button 112. In other words, this main connection member 110 comprises at least one front longitudinal end formed by the head 111, a rear longitudinal end formed by the retractable button 112, and a body connecting the head 111 to the retractable button 112. This main connection member 110, and more particularly the body of this main connection member 110, comprises at least two flanks 113 connected to each other by an upper wall 114. The two flanks 113 and the upper wall 114 of the main connection member 110 define a housing suitable for receiving at least a portion of the wiper blade. More particularly, this housing is suitable for receiving a connector formed integrally with the wiper blade.

At least one cutout 117 is provided in the upper wall 114 of the main connection member 110. As will be described in greater detail below, this cutout 117 permits cooperation between a retaining member 128 provided on the secondary connection member 120 and a lower face of the upper wall 114 of the main connection member 110. The term "lower face" means a face of the upper wall 114 of the main connection member 110 facing the glass surface to be wiped when the connection device 100 according to the invention is mounted on the wiper blade. The upper wall 114 of the main connection member 110 thus comprises a front portion 118 which extends between the head 111 and the cutout 117 provided in this upper wall 114 and a rear portion 119 which, for its part, extends between this cutout 117 and the retractable button 112.

The upper wall 114 comprises at least one resilient tongue 115 carrying the retractable button 112. The term "resilient tongue" here means a portion of the upper wall 114 of the main connection member 110 suitable for returning to its initial position after having undergone mechanical deformation. As shown, this resilient tongue 115 thus extends between a hinge 115' and the retractable button 112, the hinge 115' forming a pivot axis of the resilient tongue 115. In addition, a free space 115" is provided between the resilient tongue 115 and each of the flanks 113 of the main connection member 110. In other words, it is thanks to this resilient tongue 115 that the retractable button 112 can move up or down, by bending the resilient tongue 115, about the pivot axis formed by the hinge 115'. According to the example illustrated in FIG. 2, the rear portion 119 of the upper wall 114 is formed, for the most part, by this resilient tongue 115 which carries the retractable button 112. This retractable button 112 is suitable for being received in an orifice provided in the clevis of the first wiper arm, and more particularly in an upper wall of the clevis of this first wiper arm. The cooperation between this retractable button 112 and the orifice that receives it forms a first cooperation means between the connection device 100 and the clevis of the first wiper arm.

One of the flanks 113 of the main connection member 110 comprises at least one pivot bearing 116 suitable for receiving a rotation axis of the connection device 100 with respect to the wiper blade on which it is intended to be mounted. According to the illustrated example, this pivot bearing 116 has a square shape. The other flank 113 has at least one portion 116' suitable for engaging with a complementary shape provided on the connector integral with the wiper blade.

At least one cavity 130 is also provided in one of the flanks 113 of the main connection member 110, this at least one cavity 130 opening out onto an upper face of the upper wall 114 of the main connection member 110. The term "upper face" means a face of the upper wall 114 of the main connection member 110 facing away from its lower face as defined above. In other words, the upper wall 114 of the main connection member 110 is vertically delimited by its upper face on the one hand and by its lower face on the other hand. This at least one cavity 130 is suitable for receiving a tab 121 of the secondary connection member 120. This at least one cavity 130 opens out more particularly onto the upper face of the front part 118 of the upper wall 114 of the main connection member 110, i.e., between the head 111 of the main connection member 110 and the cutout 117 provided in the upper wall 114 of this main connection member 110. According to the illustrated example, a cavity 130 is provided in each of the flanks 113, these cavities 130 both opening out onto the upper face of the upper wall 114 of the main connection member 110, and more particularly onto the upper face of the front portion 118 of this upper wall 114. Each of these cavities 130 is suitable for receiving at least one tab 121 provided on the secondary connection member 120. These cavities 130 are distributed on either side of a longitudinal and vertical median plane P of the main connection member 110. According to the illustrated example, this median plane P forms a plane of symmetry of the upper wall 114 of the main connection member 110.

A recess is further provided from a rear edge 132 of the head 111 of the main connection member 110, i.e., from an edge of this head 111 facing the rear longitudinal end of this main connection member 110 formed by the retractable button 112. This recess generates a receiving space 131 which, in the case of use of the connection device 100 with the second wiper arm, is configured to allow the insertion of a projection 126 provided on the secondary connection member 120. In the case of such use, the rear edge 132 of the head 111 is suitable for forming an abutment with the secondary connection member 120. In the case of use of the connection device 100 with the first wiper arm, the rear edge 132 of the head 111 is suitable for forming an abutment with the free longitudinal end of the clevis of this first wiper arm. These various cooperations between the head 111 of the main connection member 110, the secondary connection member 120, and the free end of the clevis of the first wiper arm will be more fully detailed below.

The head 111 of the main connection member 110 is wider and higher than the body of this main connection member 110. In other words, the head 111 of the main connection member 110 extends beyond the upper wall 114, along the vertical axis V of the illustrated trihedron, and beyond each of the flanks 113 transversely, that is to say, parallel to the transverse axis T of the illustrated trihedron. Advantageously, such dimensions allow the rear edge 132 of the head 111 to come to bear against the free longitudinal end of the clevis of the first wiper arm, as illustrated for example in FIG. 4, and against the secondary connection member 120, when the connection device 100 is used with the second wiper arm, as illustrated in FIGS. 6 and 7.

The secondary connection member 120 also extends along a main axis of extent X' parallel to the longitudinal axis L of the illustrated trihedron. This secondary connection member 120 comprises at least one side lug 122 suitable for being arranged in contact with one of the flanks 113 of the main connection member 110. This side lug 122 has an oblong shape, with a rounded portion extending rearwardly. According to the example illustrated here, the secondary connection member 120 comprises two side lugs 122—only one being visible in the figures—distributed on either side of a longitudinal and vertical median plane of this secondary connection member 120. According to the illustrated example, this median plane more particularly forms a plane of symmetry of the secondary connection member 120.

These two side lugs 122 are extended in each case by a side branch 123', these two side branches 123' being connected to each other by an upper bridge 123 from which an upper wall 124 emerges. The two side branches 123' and the upper bridge 123 are U-shaped, seen in a vertical and transverse plane. More particularly, the upper bridge 123 forms a base of this U shape, from which each of the side branches 123' extend, thus forming the branches of this U shape. Each side lug 122 lies mainly in a vertical and longitudinal plane, i.e., a plane in which the longitudinal axis L and the vertical axis V of the illustrated trihedron lie. In addition, each side branch 123' extends, for the most part, in a plane coinciding with the main plane of extent of the side lug 122 that it extends. Lastly, each side lug 122 extends in a main direction secant to, advantageously perpendicular to, a main direction of extent of the side branch 123' that extends it. According to the illustrated example, the main direction of extent of each side lug 122 is parallel to the longitudinal axis L of the illustrated trihedron.

With regard to the upper wall 124, this lies in a longitudinal and transverse plane, i.e., a main plane of extent of the upper wall 124 is a plane in which the longitudinal axis L and transverse axis T of the illustrated trihedron lie. As will be better seen in FIG. 7, the upper bridge 123 and the upper wall 124 have a vertical offset from each other. In other words, the upper bridge 123 extends beyond the upper wall 124 along the vertical axis V of the illustrated trihedron, thus forming a shoulder 101. Advantageously, and as will be more fully detailed below, this vertical offset allows the formed shoulder 101 to abut the free longitudinal end of the clevis of the second wiper arm of the wiper system for which the secondary connection member 120 of the connection device 100 according to the invention is intended.

As shown, the upper wall 124 thus extends between the upper bridge 123 that connects the side branches 123' and a protrusion 125. As further detailed below, this protrusion 125 is suitable for being received in a hole provided in the clevis of the second wiper arm, and more particularly in an upper wall of this clevis of the second wiper arm. An cooperation between the protrusion 125 and the hole in which the protrusion is received forms a first cooperation means between the connection device 100 and the second wiper arm. When used with the second wiper arm, the connection device 100 comprises the secondary connection member 120 stacked on the main connection member 110. This has the result that, in such use, the protrusion 125 is interposed, at least partially, between the retractable button 112 and the clevis of the second wiper arm. This protrusion 125 has at least one indentation 129 configured to come to bear against the retractable button 112 provided on the main connection member 110. As shown, this indentation 129 is more particularly provided from a rear edge 133 of the protrusion 125, i.e., from a rear longitudinal end of the secondary connection member 120. The expression "rear longitudinal end of the secondary connection member" means a most extreme point of the secondary connection member 120 taken along the main axis of extent X' of this secondary connection member 120.

As previously discussed, the secondary connection member 120 comprises a projection 126 suitable for being inserted into the receiving space 131 provided from the rear edge 132 of the head 111 of the main connection member 110. As illustrated, this projection 126 emerges from the upper bridge 123 and has a curvature suitable for engaging with a bead provided under the head 111 of the main connection member 110. Advantageously, the curvature of the projection 126 forms a guide for mounting the secondary connection member 120 on the main connection member 110. It is noted that this projection 126 also forms a front longitudinal end of the secondary connection member 120. In other words, it is understood from the foregoing that the secondary connection member 120 extends along the main axis of extent X', between the projection 126 and the protrusion 125.

As previously described, at least one cavity 130 is provided in one of the flanks 113 of the main connection member 110, the at least one cavity 130 being suitable for receiving a tab 121 of the secondary connection member 120. As illustrated in FIG. 2, this at least one tab 121 emerges from the upper wall 124 of the secondary connection member 120 and extends downwardly, i.e., towards one of the side lugs 122, in a vertical direction, i.e., a direction perpendicular, or substantially perpendicular, to the main plane of extent of the upper wall 124.

Advantageously, the secondary connection member 120 comprises at least two tabs 121 that emerge, respectively, from two parallel edges of the upper wall 124 of the secondary connection member 120. Each of these tabs 121 is suitable for being received in one of the cavities 130 provided, at least in part, in the front portion 118 of the upper wall 114 of the main connection member 110. These tabs 121 thus emerge from a front portion of the upper wall 124 of the secondary connection member 120, i.e., these tabs 121 are provided closer to the upper bridge 123 than to the protrusion 125 of the secondary connection member 120.

Advantageously, the cooperation of the tabs 121 with their respective cavities 130 implemented once these tabs 121 are inserted in the cavities 130, allows a force recovery when the second wiper arm is in motion, i.e., when this second wiper arm drives in rotation the wiper blade to which it is connected through the connection device 100. More particularly, this cooperation allows the transverse forces, i.e., the forces applying parallel to the transverse axis T of the illustrated trihedron, undergone by the connection device 100 during phases of wiping the glass surface of the vehicle equipped with the wiping system according to the invention, to be taken up.

A through-groove 127 is also provided in the upper wall 124 of the secondary connection member 120. The term "through-groove" means the fact that this groove opens out both onto the upper face and onto the lower face of the upper wall 124 of the secondary connection member 120. As will be more fully detailed below, particularly with reference to FIG. 7, at least one retaining member 128 extends from an edge 134 delimiting this groove 127.

Lastly, it is noted from FIG. 2 that the upper bridge 123 comprises at least one narrowed front portion 123a. In other words, this front portion 123a has a transverse dimension, i.e., a dimension measured parallel to the transverse axis T of the illustrated trihedron, between two opposite edges of this front portion 123a, that is smaller than a transverse dimension—measured according to the same constraints—of a rear portion 123b of this upper bridge 123. As further detailed below, the front portion 123a of the upper bridge 123 is suitable for being received in the receiving space 131 provided in the head 111 of the main connection member 110. In other words, this front portion 123a is suitable for abutting against the head 111 of the main connection member 110.

With reference to FIG. 3, we will describe more fully the connection device 100 suitable for use with the second wiper arm, that is to say, the connection device 100 formed by stacking the secondary connection member 120 on the main connection member 110, along the stacking direction D. This FIG. 3 thus makes visible, in particular, the cooperation between the tabs 121 and the cavities 130 that receive them, the arrangement of the side lugs 122 of the secondary connection member 120 against the flanks 113 of the main connection member 110—only one of these side lugs 122 and only one of these flanks 113 being visible in FIG. 3—as well as the cooperation between the narrowed front portion 123a and the receiving space 131 provided in the head 111 of the main connection member 110. The rear edge 132 of the head 111 is arranged in contact with the upper bridge 123, as well as with the side branches 123' that carry the side lugs 122. More particularly, this rear edge 132 of the head 111 forms an abutment with the upper bridge 123 and the side branches 123', thus participating in the longitudinal blocking of the secondary connection member 120 with respect to the main connection member 110.

This FIG. 3 also illustrates an arrangement of the protrusion 125 relative to the retractable button 112. As discussed above, the protrusion 125 has an indentation 129 in which the retractable button 112 is received. In other words, when the main connection member 110 and the secondary connection member 120 are stacked on top of each other, the protrusion 125 and the retractable button 112 are at least partially superimposed on each other. There is also a longitudinal offset between the retractable button 112 of the main connection member 110 and the protrusion 125 of the secondary connection member 120. This longitudinal offset participates in the adaptability of the connection device 100 according to the invention to the two types of wiper arms mentioned above.

The secondary connection member 120 is thus sandwiched between the head 111 of the main connection member 110, and more particularly between the rear edge 132 of this head 111, and the retractable button 112 of this main connection member 110, thus limiting the longitudinal movements of the secondary connection member 120 relative to the main connection member 110.

The first wiper arm and the second wiper arm each comprise a clevis consisting of at least two side walls connected to each other by an upper wall. The two side walls and the upper wall of the same clevis define a zone for receiving the connection device according to the invention. The orifice provided in the upper wall of the clevis of the first wiper arm has a longitudinal offset from the hole in the upper wall of the clevis of the second wiper arm. In other words, a distance measured parallel to the longitudinal axis L of the trihedron between the free longitudinal end of the clevis of the first wiper arm and a contour of the orifice is greater than a distance measured parallel to the longitudinal axis L of the trihedron between the free longitudinal end of the clevis of the second wiper arm and a contour of the hole provided in that clevis. The longitudinal offset between the protrusion 125 and the retractable button 112 is, according to the invention, equivalent to the longitudinal offset between the orifice and the hole provided respectively in the clevises of the first and second wiper arms.

As described below, the side lugs 122 are suitable for participating in the vertical locking of the connection device 100 with respect to the clevis of the second wiper arm. This second wiper arm comprises for this purpose apertures suitable for receiving these side lugs 122. In other words, a cooperation between the side lugs 122 and the apertures provided in the clevis forms a second cooperation means between the connection device 100 and the second wiper arm.

FIGS. 4 and 5 illustrate the connection device 100 shown in cooperation with the clevis 221 of the first wiper arm 220. This clevis 221 thus comprises the two side walls 201—only one of them being visible in FIG. 4—connected to each other by the upper wall 202 in which the orifice 222 suitable for receiving the retractable button 112 of the main connection member 110 is provided. The connection device 100 suitable for cooperation with the clevis 221 of the first wiper arm 220 is devoid of the secondary connection member.

FIG. 4 illustrates, in perspective view from above, the connection device 100 shown in cooperation with the clevis 221 of the first wiper arm 220. It is understood from this figure that the cooperation between the retractable button 112 and the contour of the orifice 222 allows for longitudinal and transverse locking of the connection device 100 with respect to the clevis 221 in which the orifice 222 is provided.

The retractable button 112 is carried by the previously described resilient tongue such that it can be disengaged by exerting vertical pressure on said retractable button 112. In order to prevent spontaneous disengagement of this retractable button 112, the latter has a retaining finger 112' that extends its upper wall 112a, i.e., a wall of this retractable button 112 that extends mostly beyond the orifice 222, and outside the receiving zone of the connection device 100. In the event of an untimely movement of the retractable button 222 that could cause the latter to disengage, the retaining finger 112' is suitable for coming into abutment against the upper wall 202 of the clevis 221 of the first wiper arm 220 so as to prevent such disengagement.

The vertical locking of the connection device 100 with respect to the clevis 221 of the first wiper arm 220 is, for its part, achieved through cooperation between at least one folded edge of the clevis and the main connection member. This cooperation is, for example, illustrated in FIG. 5.

This FIG. 5 illustrates, in perspective view from below, the connection device 100 in cooperation with the clevis 221 of the first wiper arm 220. At least one of the side walls 201 of this clevis 221 has a lower edge 225 folded back towards the receiving zone 226 suitable for receiving the connection device 100. The term "lower edge 225" means a free edge of the side wall 201 in question opposite an upper edge which is itself connected to the upper wall 202 of the clevis 221. This folded lower edge 225 is arranged in contact with a lower edge 113' of one of the flanks 113 of the main connection member 110. The main connection member 110 is thus sandwiched between the upper wall 202 of the clevis 221 of the first wiper arm 220 and at least one folded lower edge 225, so that the vertical movements of this main connection member 110 with respect to the clevis 221 of the first wiper arm 220 are prevented, or at least limited. In other words, the receiving zone 226 suitable for receiving the connection device 100 is defined by the upper wall 202 of the clevis 221, by the side walls 201 of said clevis 221, and by the at least one folded lower edge 225. This cooperation between the folded lower edge 125 and the lower edge 113' of the side wall 113 of the relevant main connection member 110 forms the second cooperation means between the clevis 221 of the first wiper arm 220 and the connection device 100 according to the invention. According to the illustrated example, the lower edges 225 of the two side walls 201 are thus folded back and are respectively arranged in contact with the lower edge 113' of one of the flanks 113 of the main connection member 110.

FIGS. 6 and 7, on the other hand, illustrate the connection device 100 in cooperation with the clevis 321 of the second wiper arm 320.

FIG. 6 is a perspective view of the connection device 100 shown in cooperation with the clevis 321 of the second wiper arm 320 of the wiper system for which this connection device 100 is intended. The clevis 321 of the second arm 320 thus comprises the two side walls 301—only one of which is visible in FIG. 6—connected to each other by the upper wall 302, these side walls 301 and this upper wall 302 delimiting the receiving zone suitable for receiving the connection device 100. The connection device 100 that cooperates with the clevis 321 of the second wiper arm 320 comprises the main connection member 110 and the secondary connection member 120 stacked on top of each other.

As previously mentioned, a hole 322 is provided in the clevis 321, and more particularly in the upper wall 302 of this clevis 321, this hole 322 receiving the protrusion 125 of the secondary connection member 320. It is understood that the cooperation between this protrusion 125 and a contour that delimits the hole 322 allows for longitudinal and transverse locking of the secondary connection member 120—and therefore of the entire connection device 100. In other words, this cooperation between the protrusion 125 and the contour of the hole 322 allows a locking of the connection device 100 along a direction parallel to the transverse axis T of the illustrated trihedron and also along a direction parallel to the longitudinal axis L of this trihedron. This cooperation forms the first cooperation means between the clevis 321 of the second arm 320 and the connection device 100.

It is also noted that this protrusion 125 has a retaining lip 125' that extends it longitudinally. Advantageously, this retaining lip 125' is configured to form a vertical stop on the clevis 321, and more particularly on the upper wall 302 of this clevis 321, so as to avoid spontaneous disengagement of the protrusion 125 from the hole 322.

As previously discussed, the head 111 of the main connection member 110, and more particularly the rear edge 132 of the head 111, is suitable for abutting the secondary connection member 120. As illustrated, the rear edge 132 of the head 111 of the main connection member 110 is more particularly arranged in abutment against a front edge of the upper bridge 123 of the secondary connection member 120, and against a front edge of the side branches 123', i.e., an edge of this upper bridge 123 and of these side branches 123' turned towards the protrusion which forms the front longitudinal end of this secondary connection member 120.

Even more particularly, the rear edge 132 of the head 111 of the main connection member 110 is arranged, at least partially, in abutment against a front edge 136 of the rear portion 123b of the upper bridge 123 of the secondary connection member 120. The front portion 123a of the upper bridge 123 of the secondary connection member 120 is, for its part, received in the receiving space 131 generated by the recess made in this head 111. As a result, a contour 137 of the receiving space 131 is arranged in contact with a front edge 138 of the front portion 123a of the upper bridge 123. It is understood that the cooperation between the front portion 123a of the upper bridge 123 and the contour 137 of the receiving space 131 allows a transverse locking of the secondary connection member 120 with respect to the main connection member 110, i.e. a locking along the transverse axis T of the illustrated trihedron.

As mentioned above, the upper bridge 123 and the upper wall 124 of the secondary connection member 120 are vertically offset from each other so as to form the shoulder 101 which is arranged in abutment against the clevis 321 of the second wiper arm 320, and more particularly against the free longitudinal end 324 of this clevis 321. As a result, the upper bridge 123 of the secondary connection member 120 is interposed between the head 111 of the main connection member 110 and the clevis 321 of the second wiper arm. Such an arrangement advantageously allows longitudinal locking of the secondary connection member 120.

In addition, an aperture 311 is provided in each side wall 301 of the clevis 321 of the second wiper arm 320—only one of which is visible in FIG. 6. As shown, the aperture 311 takes the form of an oblong cutout open at one longitudinal end and is suitable for receiving one of the side lugs 122 of the secondary connection member 120. More particularly, the oblong cutout shape opens out onto the free longitudinal end 324 of the clevis 321 of the second wiper arm 320. The cooperation between each side lug 122 and the aperture 311 that receives it, and more specifically with an edge that delimits this aperture 311, makes it possible to block the vertical movements of the connection device 100 with respect to the clevis 321, i.e., the movements along a direction parallel to the vertical axis V of the illustrated trihedron. This cooperation forms the second cooperation means between the clevis 321 of the second arm 320 and the connection device 100.

FIG. 7, on the other hand, illustrates the connection device 100 according to the invention in cooperation with the clevis 321 of the second wiper arm of the wiper system for which the connection device 100 is intended, according to a longitudinal section, i.e., a section taken along a longitudinal and vertical plane A-A illustrated in FIG. 6.

In particular, this FIG. 7 makes the aforementioned retaining member 128 more visible. As illustrated, the retaining member 128 emerges from an edge 134 that participates in delimiting the through-groove 127 provided in the upper wall 124 of the secondary connection member 120 and extends in a direction perpendicular, or substantially perpendicular, to the main plane of extent of the upper wall 124 of the secondary connection member 120. Advantageously, at least two retaining members 128 may emerge from the same edge 134—only one of which is visible in FIG. 7. It is noted that this retaining member 128 emerges more particularly from the rear edge of the groove 127, i.e., the edge of this groove 127 located closest to the protrusion 125. This retaining member 128 is suitable for abutting against the lower face 135 of the upper wall 114 of the main connection member 110.

In other words, it is understood that this retaining member 128 is suitable for being received in the cutout 117 provided in the upper wall 114 of the main connection member 110. The upper wall 114 of the main connection member 110 is then sandwiched between the retaining member 128 and the upper wall 124 of the secondary connection member 120 from which they emerge. More particularly, this retaining member 128 takes the form of a rod which originates on the upper wall 124 of the secondary connection member 120 and which ends in a lug 128' that forms the portion of this retaining member that is arranged in contact with the lower face 135 of the upper wall 114 of the main connection member 110.

This retaining member 128 thus allows a vertical blocking of the main connection member 110, i.e. a blocking, or at least a limitation, of the movements of the main connection member 110 with respect to the secondary connection member 120, along the vertical axis V and take part in holding the secondary connection member 120 on the main connection member 110.

Advantageously, the secondary connection member 120 may comprise at least two identical retaining members 128.

As previously discussed, the secondary connection member 120 and the main connection member 110 are stacked on top of each other along the vertical stacking direction D. As a result, the upper wall 124 of the secondary connection member 120 at least partially overlaps the upper wall 114 of the main connection member 110.

As previously mentioned, the protrusion 125 is received in the hole 322 provided in the clevis 321 of the second wiper arm. According to the invention, this protrusion 125 is interposed, partially, between the retractable button 112 and the clevis 321 of the second wiper arm 320.

It is understood from FIG. 7 that the positioning of the secondary connection member 120 on the main connection member 110 leads to a vertical displacement of the resilient tongue 115, and therefore of the retractable button 112 that it carries. The tongue being resilient, it tends, after having undergone a mechanical deformation, to return to its initial position. As a result, the retractable button 112 exerts a vertical, upward force on the protrusion 125. This force participates in holding the protrusion 125 in the hole 322. In the same way, the resilient nature of the resilient tongue 115 which carries the retractable button 112 facilitates the disengagement of the protrusion 122 from the hole 322. Indeed, it is understood that this disengagement is possible by exerting pressure directly on an upper wall 125a of the protrusion 125, i.e., on the wall of this protrusion 125 that extends mostly beyond the receiving zone 326 delimited by the clevis 321 of the second wiper arm 320.

According to an exemplary embodiment, the protrusion 125 has a substantially U-shaped longitudinal section, that is to say a section seen in a longitudinal and vertical plane. In other words, this protrusion 125 has at least the upper wall 125a, which forms a base of this U shape, from which there emerge a front branch 125b and a rear branch 125c, parallel or substantially parallel to each other. Due to the indentation provided in the protrusion, the rear branch 125c is shorter than the front branch 125b of this U shape. With regard to the retaining lip 125', this is provided in the extension of the upper wall 125a of this protrusion 125.

As shown, it is specifically the support of the rear branch 125c of the protrusion 125 that causes a flexed position of the resilient tongue 115.

The retractable button 112 also has a substantially U-shaped longitudinal section, the upper wall 112a of which forms a base of this U shape, from which there emerge a front branch 112b and a rear branch 112c. Furthermore, the upper wall 112a is extended longitudinally by the retaining lug 112', as described with reference to FIG. 4.

The rear branch 125c of the protrusion 125 abuts the upper wall 112a of the retractable button 112. More particularly, this rear branch 125c comes to rest against a front portion of this upper wall 112a, that is to say, a portion of this upper wall 112a closer to the front branch 112b than to the rear branch 112c of this retractable button 112. In other words, it is understood that without this protrusion 125, the retractable button 112 would interfere with the upper wall 202 of the clevis 321 of the second wiper arm 320.

Furthermore, a main plane of extent of the upper wall 112a of the retractable button 112 is secant to a main plane of extent of the upper wall 125a of the protrusion 125 when the main connection member 110 and the secondary connection member 120 are stacked on top of each other.

Advantageously, the connection device 100 according to the invention can thus be used with at least two distinct types of clevises which differ from each other, at least, by the longitudinal position of the orifice and the hole respectively provided in the upper wall of the clevis of the first wiper arm and in the upper wall of the clevis of the second wiper arm. When using the connection device with the first wiper arm, it is then the retractable button that is received in the orifice provided in the clevis of this first wiper arm, and, when using the connection device with the second wiper arm, it is the protrusion, pushed by the resilient return force of the resilient tongue carrying the retractable button, that will be received in the hole provided in the clevis of this second wiper arm. It is thus appropriate to consider that the retractable button has a first function of mechanically holding the main connection member in the clevis of the first wiper arm, thanks to the cooperation between this retractable button and the contour of the orifice provided in this clevis, as well as a second function of holding the protrusion in position within the hole provided in the clevis of the second wiper arm.

Lastly, it is noted that a bead 111' is provided under the head 111 of the main connection member 110, that is to say this bead 111' extends from this head 111 of the main connection member 110, in the direction of the wiper blade when the connection device is mounted in the wiping system for which it is intended. According to an exemplary embodiment, this bead 111' cooperates with the projection 126 that forms the front longitudinal end of the secondary connection member 120. It is understood that this projection 126 is inserted into the head 111 of the main connection member 110 through the receiving space 131 provided from the rear edge 132 of the head 111, and then is slid under the aforementioned bead 111'. This cooperation participates in the vertical locking of the secondary connection member 120 with respect to the main connection member 110, that is to say in the locking along the vertical axis V of the illustrated trihedron. Of course, and according to an alternative variant, the projection 126 may be engaged under a head 11 of the main connection member 110 which would be devoid of such a bead.

Lastly, this FIG. 7 makes particularly visible the vertical offset between the upper bridge 123 and the upper wall 124 of the secondary connection member 120 which allows, as mentioned above, the secondary connection member 120, and more particularly the upper bridge 123 of this secondary connection member, to be sandwiched between the main connection member 110 and the clevis 321 of the second wiper arm. Advantageously, such an arrangement participates in the longitudinal blocking of the secondary connection member 120 with respect to the main connection member 110 and with respect to the clevis 321 of the second wiper arm.

It is understood from the foregoing that the present invention thus provides a connection device intended for connecting a wiper blade to a wiper arm which can be readily suitable for use with at least two different types of wiper arms, it being understood that the foregoing description does not limit the scope of the present invention. In particular, other modes of assembly not described here may be envisioned without departing from the context of the present invention, thus allowing the connection device to be adapted to suit a very large number of different wiper arms.

The invention claimed is:

1. A connection device for connecting a wiper blade to at least two wiper arms, the connection device comprising:
   at least one main connection member configured to cooperate with a clevis of a first wiper arm; and
   at least one secondary connection member configured to cooperate with a clevis of a second wiper arm,
   wherein the at least one main connection member and the at least one secondary connection member are stacked on top of each other in a stacking direction,
   wherein the at least one main connection member comprises at least two flanks connected together by an upper wall supporting a retractable button configured to cooperate with the clevis of the first wiper arm,
   wherein the at least one secondary connection member comprises:
      at least one side lug for engaging with the clevis of the second wiper arm,
      at least one retaining member received in a cutout provided in the upper wall of the main connection member, and
      at least one protrusion configured to cooperate with the clevis of the second wiper arm, said protrusion bears on top of the retractable button.

2. The connection device as claimed in claim 1, wherein the retractable button is suitable for being received in an orifice provided in the clevis of the first wiper arm.

3. The connection device as claimed in claim 1, wherein the protrusion is for being received in a hole provided in the clevis of the second wiper arm.

4. The connection device as claimed in claim 3, wherein the retractable button is configured to generate a force against the protrusion.

5. The connection device as claimed in claim 1, wherein the secondary connection member comprises at least two side lugs, each extended by a side branch, the two side branches being connected to each other by an upper bridge, this upper bridge being extended by an upper wall bearing the protrusion.

6. The connection device as claimed in claim 5, wherein the upper bridge and the upper wall of the secondary connection member extend in two parallel and distinct planes.

7. The connection device as claimed in claim 5, wherein the at least one retaining member emerges from the upper wall of the secondary connection member and extends in a direction perpendicular to a main plane of extent of the upper wall of the secondary connection member.

8. An assembly consisting of a wiper blade and a connection device as claimed in claim 1.

9. A wiper system comprising at least one wiper blade connected to a first wiper arm or to a second wiper arm via a connection device as claimed in claim 1.

* * * * *